April 7, 1931.  W. F. LAUBE  1,799,519
CULTIVATOR SHOVEL
Filed Sept. 8, 1928
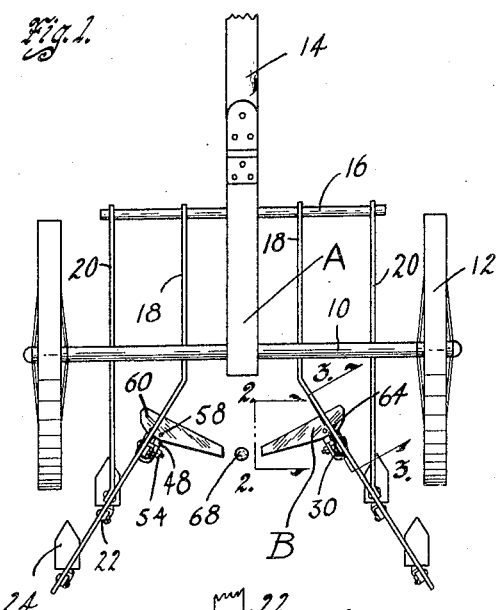
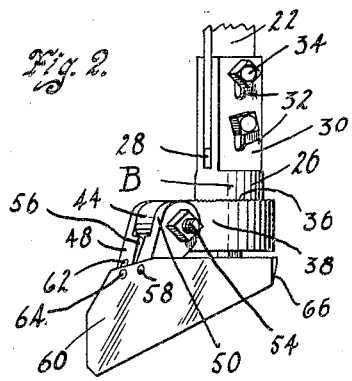
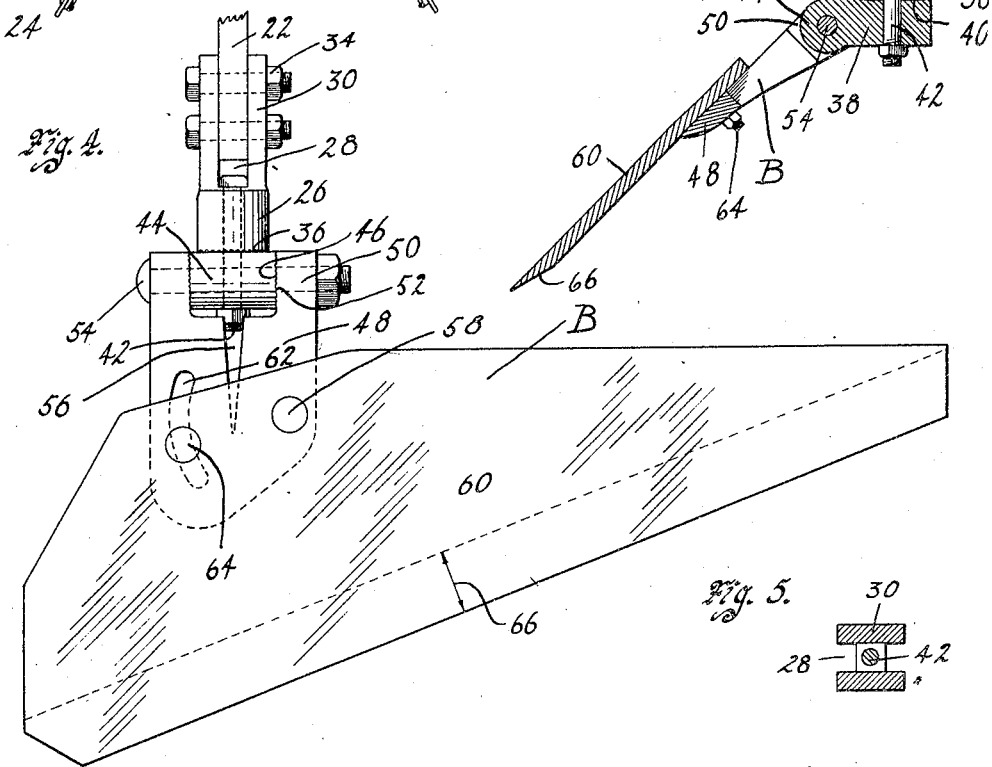
Inventor
William F. Laube
by Bair, Freeman & Sinclair
Attorneys
Witness
Vincent Brown Patented Apr. 7, 1931

1,799,519

UNITED STATES PATENT OFFICE

WILLIAM F. LAUBE, OF CLARKSVILLE, IOWA

CULTIVATOR SHOVEL

Application filed September 8, 1928. Serial No. 304,649.

The object of my invention is to provide a cultivator shovel which is simple, durable and comparatively inexpensive of construction.

A further object of my invention is to provide a cultivator shovel especially adapted for the plowing of corn and other grains or vegetables which is so constructed that it will not injure the roots even though plowing close to the corn, with the result that the corn grows much faster.

Still a further object is to provide a shovel which effectively cuts morning glories and other weeds without injuring the roots of the corn.

More specifically, it is my object to provide a cultivator shovel formed of a long narrow blade arranged substantially horizontal with one end thereof much narrower than the other end.

Another object is to provide a mounting for such a shovel blade, whereby the blade may be universally adjusted as to angle in all planes so that the blade may be arranged to best suit the crop being plowed and may be adjusted differently each time the crop is plowed so that the most effective cultivation is attained by the use of the blade.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a plan view of a cultivator, illustrating a pair of my blades used in connection therewith.

Figure 2 is a side elevation of the blade and its mounting as viewed from the line 2—2 of Figure 1, the blade itself being adjusted at a rather unnatural angle for the purpose of better illustrating the construction thereof.

Figure 3 is an enlarged sectional view on the line 3—3 of Figure 1.

Figure 4 is a front elevation of the shovel and its mounting shown in Figure 2; and Fig. 5 is a horizontal section thru the lower part of the bifurcated portion of the cultivator shovel shank.

On the accompanying drawings, I have used the reference character A to indicate generally, a cultivator. The axle 10, wheels 12, and tongue 14 are of ordinary construction and usually a pull bar 16 is provided on the cultivator. Plow beams 18 extend rearwardly from the bar 16 and are braced relative thereto by brace members 20.

Ordinarily, the beams 18 may be adjusted up or down by various control mechanisms, but since the cultivator and such mechanism are not part of my invention, I have not illustrated them on my drawings.

The beams 18 are provided with arms 22 which extend downwardly for supporting standard cultivator blades 24. In the use of my device I remove the front two blades 24 and replace them with my improved type of shovel B. My shovel consists of a shank 26 having a slot 28 therein, whereby a pair of fork arms 30 are provided. The arms 30 have slots 32 through which bolts 34 may extend for the purpose of bolting the shank 26 to the arm 22 of the cultivator beam 18. The lower end of the shank 26 is radially corrugated as indicated at 36 and a bracket 38 is provided having a similarly corrugated surface 40 to coact with the surface 36. The bracket 38 is bolted to the shank 26 by means of a bolt 42. The head of the bolt 42 is held between the arms 30 of the shank 26, whereby it is prevented from turning when the nut on the bolt is tightened.

The bracket 38 is formed with a hub 44 having radially corrugated ends 46. A mounting plate 48 is provided with a pair of arms 50 having corrugated surfaces 52 to coact with the corrugated surfaces 46 of the hub 44.

A bolt 54 extends through the arms 50 and the hub 44 for the purpose of clamping the arms 50 against the ends of the hub. A slot 56 is provided in the plate 48 to provide for slight inward and outward movement of the arms 50.

The mounting plate 48 is provided with an opening through which a countersunk head bolt 58 extends. The bolt 58 is provided for the purpose of pivotally mounting a cultivator blade 60 on the plate 48. The plate 48 is provided with a curved slot 62 adapted to receive a counter-sunk head bolt 64 which also extends through the blade 60.

The bolt and slot connection 64 and 62 provides for adjustment of the blade 60 about the bolt 58 as a pivot.

The blade 60 is beveled and sharpened on its rear surface as indicated at 66. The blade 60 is substantially wide at one end and tapers toward the other end, terminating in a narrow inner end adapted to travel adjacent the hill of corn 68, shown in Figure 1.

*Practical operation*

In the operation of my device, the blade 60 may be adjusted at any angle relative to the ground to be cultivated and to any angle relative to the hill of corn 68. Thus, the blade may be made to plow deeply or shallow and may turn the soil over or merely cut along underneath the surface without disturbing such surface and yet cut all the roots of the weeds to prevent them from growing.

I have found that it is desirable to cultivate close to the corn without cutting the roots thereof and that such cultivating cannot be accomplished with the ordinary type of spade shovel 24 because it cuts so deeply in order to cut the weed roots that it also cuts the corn roots.

The effect of such deep cutting is to stunt the growth of the corn, since it practically stops growing for a day or two after cultivation.

My blade 60 may be adjusted at about the angle shown in Figure 3 or even at a smaller angle relative to the ground surface, whereby the blade will cultivate shallow and thereby not cut the corn roots. In such position of adjustment, however, the blade operates properly for cutting the weed roots and especially morning glories which are detrimental to the growth of corn.

As the corn is gone over for the second and third time and so on, the blade may be adjusted each time to cut a little deeper, which encourages the roots to root more deeply and thereby the effect of dry weather upon the corn is not so marked.

Where it is desirable to use my shovel as a potato hiller, a shovel may be provided on each of the arms 22 and they may be adjusted at such an angle as to throw the cultivated earth inwardly toward the potato row.

Where the arms 22 of the cultivator are not arranged to swing backwardly against the action of a spring when great resistance is encountered by the cultivator blade, one or both of the bolts 34 may be replaced by wooden break pins.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A cultivator shovel comprising a forked shank having a boss on the lower end thereof, a bracket pivoted to said boss by a vertical bolt, a mounting plate pivoted to said bracket on a horizontal axis and a cultivator blade on said mounting plate.

2. A cultivator shovel comprising a shank, a bracket vertically pivoted thereto and having a hub, a mounting plate horizontally pivoted to the hub of said bracket, said mounting plate comprising a plate portion terminating in a pair of spaced hubs to fit on opposite sides of the hub of said bracket, and means for locking said mounting plate to said bracket, said means comprising a clamping bolt through said hub, said plate being split between said hubs to allow said bolt to be tightened.

Des Moines, Iowa, August 24, 1928.

WILLIAM F. LAUBE.